United States Patent
Jin et al.

(10) Patent No.: US 9,177,715 B2
(45) Date of Patent: Nov. 3, 2015

(54) SYSTEM AND METHOD FOR INDUCTIVE WIRELESS SIGNALING

(75) Inventors: Jun-De Jin, Hsinchu (TW); Fan-Ming Kuo, Hsinchu (TW); Huan-Neng Chen, Shalu (TW); Ming Hsien Tsai, Sindian (TW); Hsieh-Hung Hsieh, Taipei (TW); Tzu-Jin Yeh, Hsinchu (TW)

(73) Assignee: Taiwan Semiconductor Manufacturing Co., Ltd., Hsin-Chu (TW)

( * ) Notice: Subject to any disclaimer, the term of this patent is extended or adjusted under 35 U.S.C. 154(b) by 1285 days.

(21) Appl. No.: 12/952,429

(22) Filed: Nov. 23, 2010

(65) Prior Publication Data

US 2012/0126630 A1    May 24, 2012

(51) Int. Cl.
*H01F 5/00* (2006.01)
*H01F 38/14* (2006.01)
*H01F 17/00* (2006.01)

(52) U.S. Cl.
CPC ............... *H01F 38/14* (2013.01); *H01F 5/00* (2013.01); *H01F 17/0006* (2013.01); *H01F 2017/0086* (2013.01)

(58) Field of Classification Search
CPC .............. H01F 5/00; H01F 27/00–27/30
USPC .............. 336/200, 232, 65, 83; 257/531
See application file for complete search history.

(56) References Cited

U.S. PATENT DOCUMENTS

| | | | | |
|---|---|---|---|---|
| 5,608,417 | A | * | 3/1997 | de Vall ............... 343/895 |
| 5,701,037 | A | * | 12/1997 | Weber et al. .......... 257/777 |
| 6,563,420 | B2 | * | 5/2003 | Brown et al. .......... 455/41.1 |
| 7,546,106 | B2 | | 6/2009 | Kuroda et al. |
| 2006/0176624 | A1 | | 8/2006 | Kuroda et al. |
| 2008/0272875 | A1 | * | 11/2008 | Huang et al. .......... 336/182 |
| 2012/0092121 | A1 | * | 4/2012 | Jin et al. .............. 336/232 |

FOREIGN PATENT DOCUMENTS

JP         07038368 A    *    2/1995

OTHER PUBLICATIONS

Mizoguchi, D., et al., "A 1.2Gb/s/pin Wireless Superconnect Based on Inductive Inter-Chip Signaling (IIS)", IEEE International Solid-State Circuits Conference, 2004, Session 7, TD: Scaling Trends/7.6, pp. 1-10.

Simburger, W., et al., "A Monolithic Transformer Coupled 5-W Silicon Power Amplifier with 59% PAE at 0.9 GHz", IEEE Journal of Solid-State Circuits, Dec. 1999, 34(12):1881-1892.

* cited by examiner

*Primary Examiner* — Tuyen Nguyen
(74) *Attorney, Agent, or Firm* — Duane Morris LLP

(57) ABSTRACT

A transformer includes first and second semiconductor substrates. The first semiconductor substrate includes a first circuit, a first coil providing a first impedance, and a first capacitor coupled in parallel with the first coil. The second semiconductor substrate includes a second circuit, a second coil providing a second impedance and inductively coupled with the first coil, and a second capacitor coupled in parallel with the second coil.

20 Claims, 4 Drawing Sheets

SYSTEM AND METHOD FOR INDUCTIVE WIRELESS SIGNALING

BACKGROUND

In various integrated circuit (IC) applications, an important consideration is inter-chip communications. Traditionally, wires have been used to perform signaling between one integrated circuit (also referred to as chip) and another. As products are continually reduced in size, reduced in power consumption, and increased in bandwidth, wireless interconnection technologies have been gaining popularity.

One technique for wireless interconnection employs the principle of inductive coupling that is utilized in transformers. In a transformer, a changing current in a primary winding (coil) creates a changing magnetic flux in the transformer's core and thus changes a magnetic field through the transformer's secondary winding. The changing magnetic field induces a changing voltage in the secondary winding. This effect is referred to as mutual induction. Inductive coupled coils have been applied to inter-chip communication with a technology known as a through-chip interconnect (TCI). A current change in a first inductor used for transmission at a first semiconductor substrate (e.g., corresponding to a first chip) generates a voltage signal at a second inductor used for reception at a second semiconductor substrate (e.g., corresponding to a second chip). By generating appropriate voltage signals, wireless communication is realized.

A challenge associated with traditional signaling based on inductive coupling is ensuring a high coupling coefficient k, which is the ratio of output current to input current as pertaining to the coils at the receiver and transmitter. High-k transformers are desired for increasing sensitivity, which relates to the minimum detectable signal at the receiver, and for reducing power consumption.

One conventional technique for raising the coupling coefficient k is substrate thinning (decreasing the thickness of substrates at the respective chips). At a given frequency, decreasing the substrate thickness tends to increase the coupling coefficient k. However, such increase in k may cause the resulting substrate to be difficult to handle (e.g., from a manufacturing or processing perspective), may raise associated costs, and may lead to roughness that in turn results in undesirable variation (nonuniformity) in the coupling coefficient.

Another conventional technique for raising the coupling coefficient is to increase inductance. Increasing the number for turns in the coils increases the inductance and generally increases the coupling coefficient, except for resonance effects that may occur at specific frequencies. However, this approach increases device area and cost.

BRIEF DESCRIPTION OF THE DRAWINGS

The following will be apparent from elements of the figures, which are provided for illustrative purposes and are not necessarily to scale.

DETAILED DESCRIPTION

Figure 1:
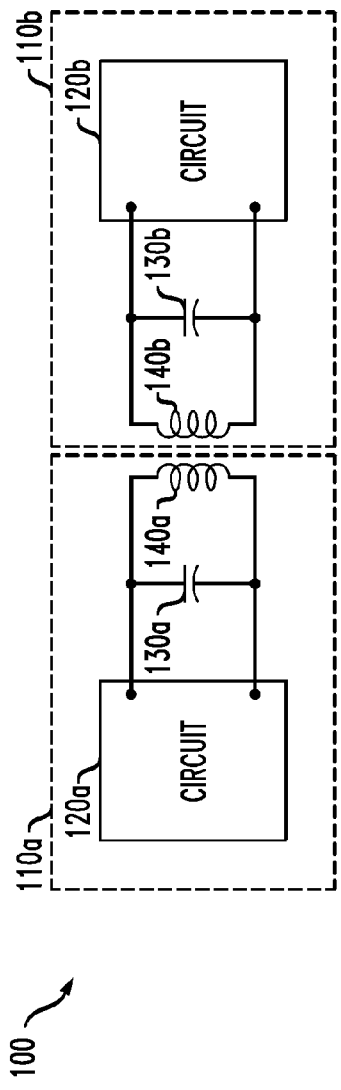
FIG. 1 is a circuit diagram of a transformer in accordance with some embodiments.

This description of the exemplary embodiments is intended to be read in connection with the accompanying drawings, which are to be considered part of the entire written description. In the description, relative terms such as "lower," "upper," "horizontal," "vertical,", "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description and do not require that the apparatus be constructed or operated in a particular orientation.

FIG. 1 is a circuit diagram of a transformer in accordance with some embodiments. A transformer 100 includes a first semiconductor substrate 110a and a second semiconductor substrate 110b that are not directly connected together by electrically conductive wires. The substrates 110a, 110b may correspond to first and second integrated circuits (ICs or chips). The substrates 110a, 110b include respective circuits 120a, 120b. Embodiments may be used for three dimensional (3D) RF IC applications. For example, the second semiconductor substrate 110b may be stacked above the first semiconductor substrate 110a, with the second coil 140b positioned above the first coil 140a.

Signaling is performed wirelessly between the substrates 110a, 110b via a through-chip interconnect (TCI) approach employing inductive coupled coils 140a and 140b at the respective substrates. A capacitor 130a is coupled in parallel with inductive coil 140a, and a capacitor 130b is coupled in parallel with inductive coil 140b. By coupling capacitors in parallel with coils, the coupling coefficient k may be improved (e.g., by more than 300% at some frequencies, and with come capacitance values) in various embodiments relative to known wireless signaling approaches, as described further below in the context of FIG. 3. The capacitance at respective capacitors 130a and 130b may be between 0 and 10 pF, the inductance at respective inductive coils 140a and 140b may be between 0 and 10 nH, and the mutual inductance may be between 0 and 10 nH. In some embodiments, capacitance at respective capacitors 130a and 130b is about 2.7 pF, inductance at respective inductive coils 140a and 140b is about 60 pH, and the mutual inductance is about 36 pH. The amplitude of a transmitted signal may be enhanced, as may the amplitude of a received signal, as described further below in the context of FIG. 4.

Capacitors 130a and 130b may be variable capacitors. Such variable capacitors may be tuned in some embodiments to provide the same capacitance (or approximately equal capacitances) to further increase the coupling coefficient. In some embodiments, capacitors 130a and 130b are metal-oxide-semiconductor (MOS) capacitors (MOScaps) or metal-insulator-metal (MIM) capacitors. The impedances provided by coils 140a and 140b may be equal or approximately equal to one another, because a transformer does not need to provide the same output impedance as input impedance for TCI application, unlike other applications, such as power amplifiers, in which the impedance is transferred.

Figure 2:
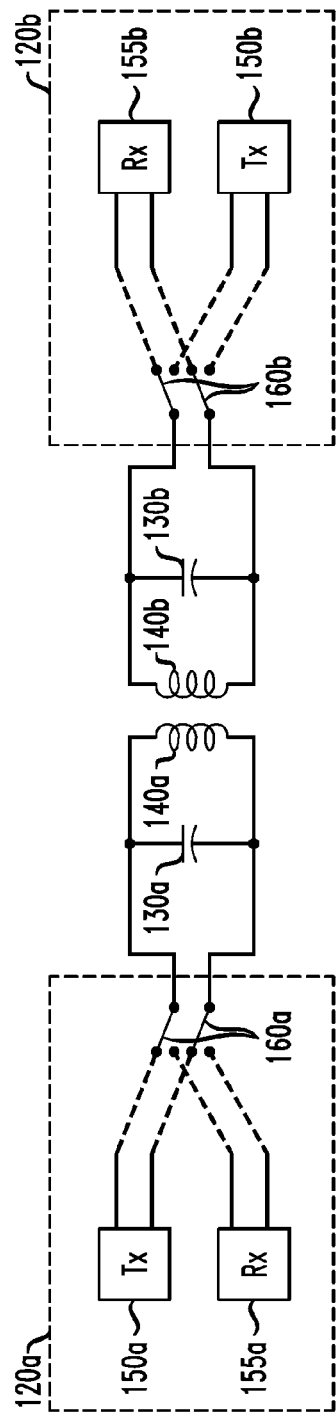
FIG. 2 is a circuit diagram of a transformer illustrating switching functionality for bidirectional communications in accordance with some embodiments.

FIG. 2 is a circuit diagram of a transformer illustrating switching functionality for bidirectional communications in accordance with some embodiments. Circuit 120a may include a transmitting circuit (transmitter) 150a, and circuit 120b may include a receiving circuit (receiver) 155b. Transmitter 150a may provide signals for transmission via inductive coupling, and receiver 155b may receive and/or process the signals. In a unidirectional communication configuration, a single transmitter 150a at circuit 120a and a single receiver 155b at circuit 120b suffice. In an optional bidirectional communication configuration, circuit 120a also includes a receiver 155a, and circuit 120b also includes a transmitter 150b. A switch 160a at substrate 110a selects one of transmitter 150a and receiver 155a for coupling to coil 140a. Similarly, a switch 160b at substrate 110b selects one of transmitter 150b and receiver 155b for coupling to coil 140b. In a first switching state, transmitter 150a is connected to coil 140a, and receiver 155b is connected to coil 140b, for transmission (signaling) from substrate 110a to substrate 110b. In a second switching state, receiver 155a is connected to coil 140a, and transmitter 150b is connected to coil 140b, for transmission from substrate 110b to substrate 110a.

Although each of switches 160a and 160b is shown in FIG. 2 in a double pole, double throw (DPDT) configuration, other switching configurations may be used. For example, a single switch may control respective couplings at both substrates.

Figure 3:
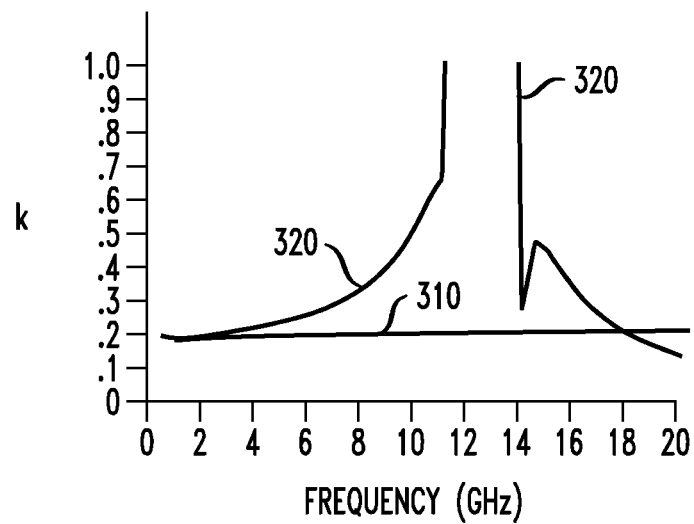
FIG. 3 is a plot of coupling coefficient performance in accordance with some embodiments.

FIG. 3 is a plot of coupling coefficient performance in accordance with some embodiments. With a conventional TCI system, e.g., one that does not employ capacitors configured in parallel with respective coils as in various embodiments, the coupling coefficient k is relatively constant over a range of frequencies from about 1 to 20 GHz. With tuned capacitors in some embodiments, the coupling coefficient is increased over a wide range of frequencies. For example, at 11 GHz, k is enhanced from 0.20 in conventional systems to 0.66 in some embodiments. In some embodiments, for frequencies higher than 11 GHz, the transformer becomes capacitive, and k may be larger than 1. At a resonant frequency, the effective coupling coefficient $k_{eff}$ may be expressed as $k_{eff}=k*sqrt(C/(G^2L(1-k^2)))$, where C may depend on the operational frequency, G is an equivalent conductance of the transformer 100, and L is specified by a coil design suited to particular area constraints. Details regarding this mathematical formulation may be found at Simburger et al., "A Monolithic Transformer Coupled 5-W Silicon Power Amplifier with 59% PAE at 0.9 GHz," IEEE Journal of Solid-State Circuits, Vol. 34, No. 12, December 1999, p. 1883.

Figure 4:
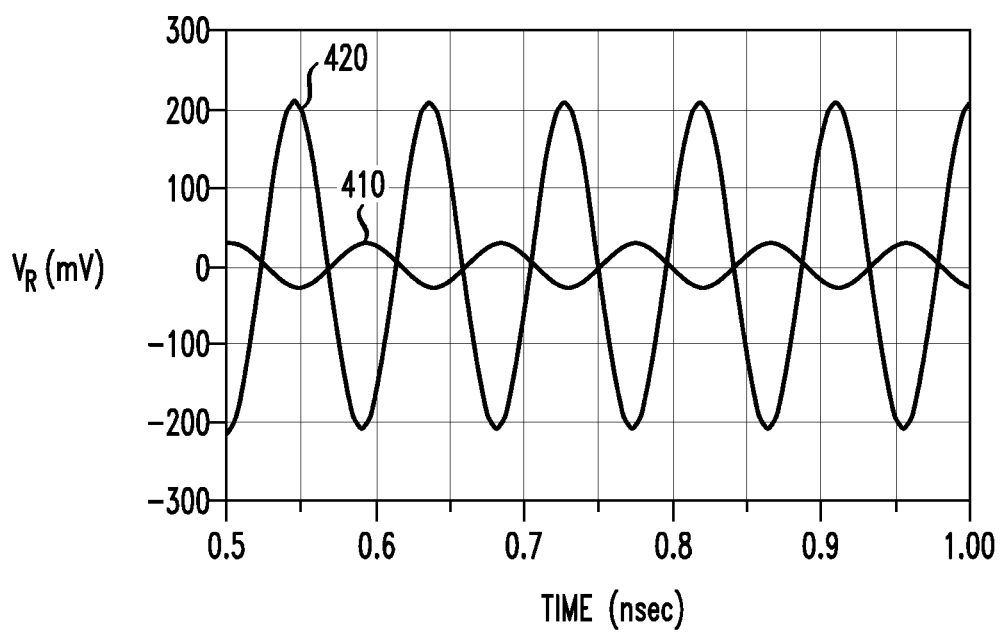
FIG. 4 is a plot of received voltage in accordance with some embodiments.

FIG. 4 is a plot of received voltage in accordance with some embodiments. With a 1 V peak-to-peak sine wave at 11 GHz, the received voltage V, is enhanced from 60 mV peak-to-peak to 420 mV peak-to-peak in some embodiments. Thus, received voltage signal 420 in some embodiments exhibits greater signal strength than received signal 410 in conventional systems.

Figure 5:
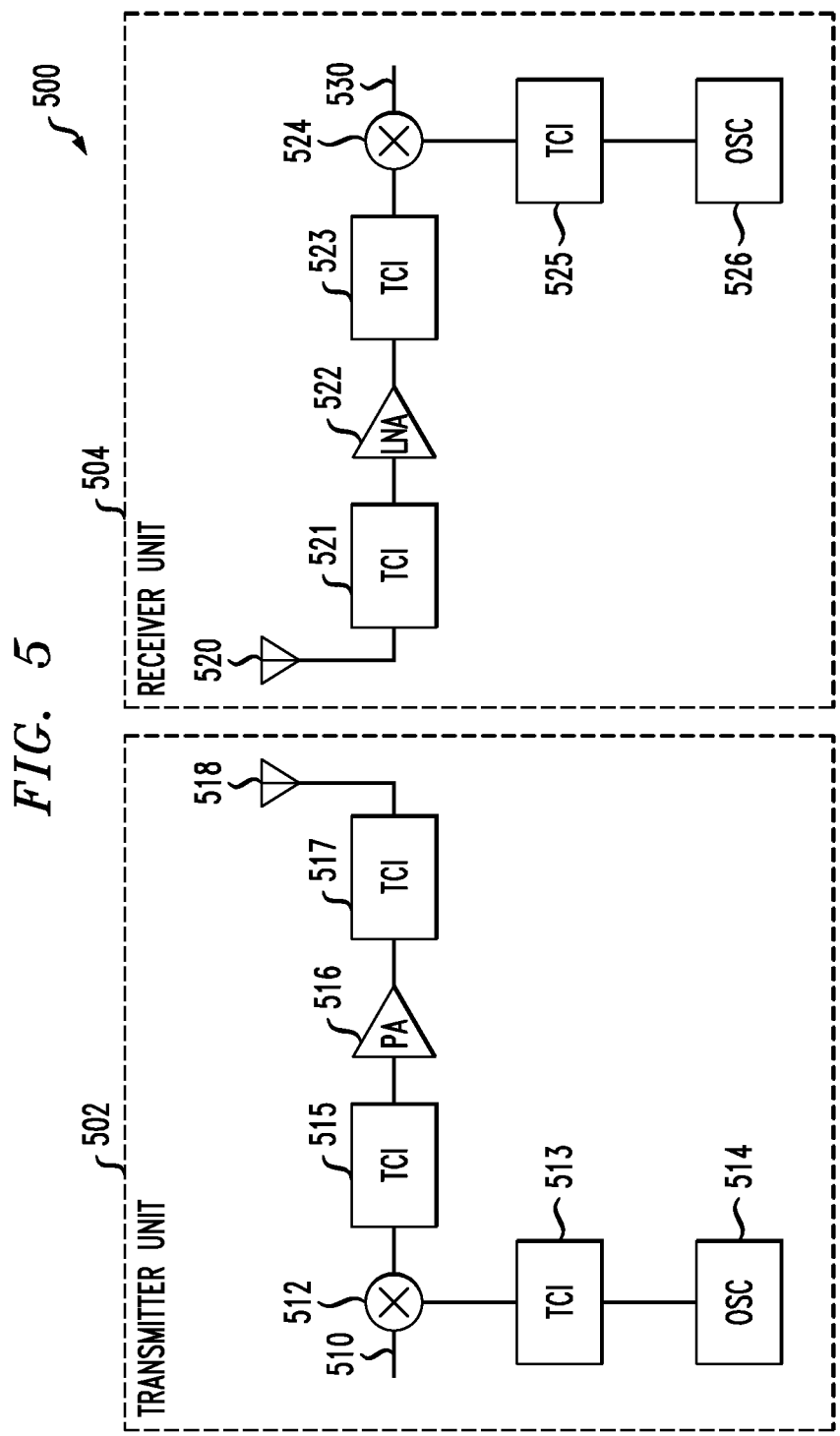
FIG. 5 is a block diagram of a communication system in accordance with some embodiments.

Embodiments may be used in various contexts where multiple chips are to be interconnected wirelessly. For example, a transformer as in FIG. 1 may be used to wirelessly connect various components of a communication system. FIG. 5 is a block diagram of a communication system 500 in accordance with some embodiments. Communication system 500 may be an RF communication system and includes a transmitter unit 502 and a receiver unit 504. At transmitter unit 502, an input signal 510 is mixed at a mixer 512 based on an output of an oscillator 514 and later processed by a power amplifier (PA) 516 and sent to a transmit antenna 518. At receiver unit 504, a signal received by a receive antenna 520 is processed by a low noise amplifier (LNA) 522 and mixed at a mixer 524, based on an output of an oscillator 526, to provide an output signal 530. Through-chip interfaces (TCIs) may be provided between various system components, e.g., as TCIs 513, 515, 517, 521, 523, and 525. Thus, inter-chip signaling is provided in this embodiment between various components with a high coupling coefficient at each interface. At each TCI shown in FIG. 5, it is understood that the adjacent circuit elements form the circuits corresponding to circuits 120a and 120b in FIG. 1.

Figure 6:
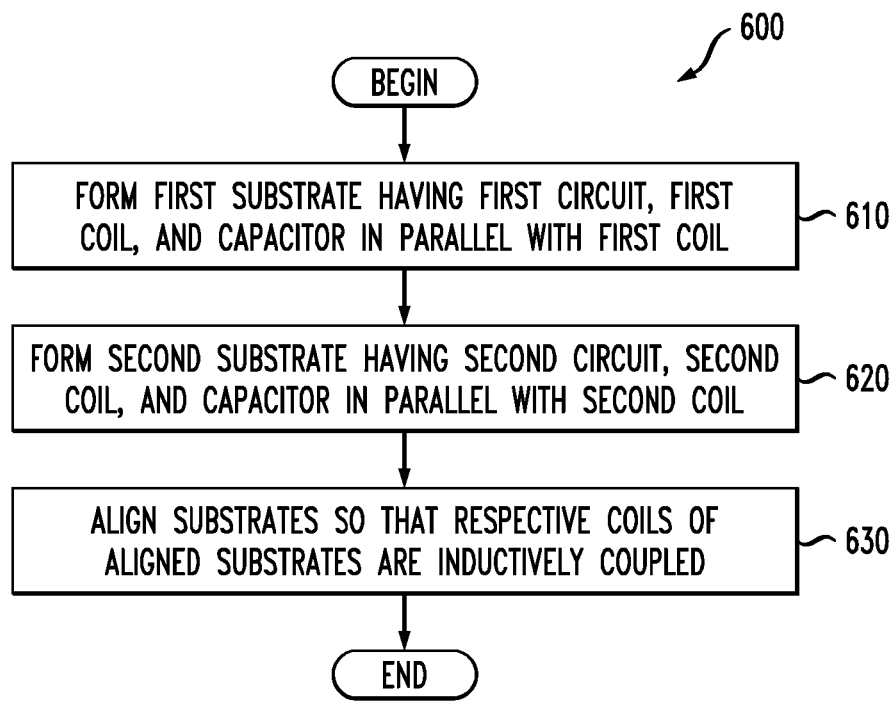
FIG. 6 is a flow diagram of a process in accordance with some embodiments.

FIG. 6 is a flow diagram of a process in accordance with some embodiments. After process 600 begins, at step 610, a first semiconductor substrate 110a is formed. The first substrate 110a includes a first circuit 120a, a first coil 140a, and a first capacitor 130a coupled in parallel with the first coil 140a. At step 620, a second semiconductor substrate 110b is formed. The second substrate 110b includes a second circuit 120b, a second coil 140b, and a second capacitor 130b coupled in parallel with the second coil 140b. At step 630, the first and second substrates 110a, 110b are aligned so that respective coils 140a and 140b are inductively coupled. Aligning the substrates 110a, 110b may include stacking the substrates vertically. The substrates may be stacked directly by a suitable adhesive, e.g., glue. The substrates may be stacked either with respective inactive faces facing each other (bottom-to-bottom), with respective active faces facing each other (face-to-face), or with respective active faces facing in the same direction (face-to-bottom). Any of these stacking configurations may be used for 3D ICs applications.

Figure 7:
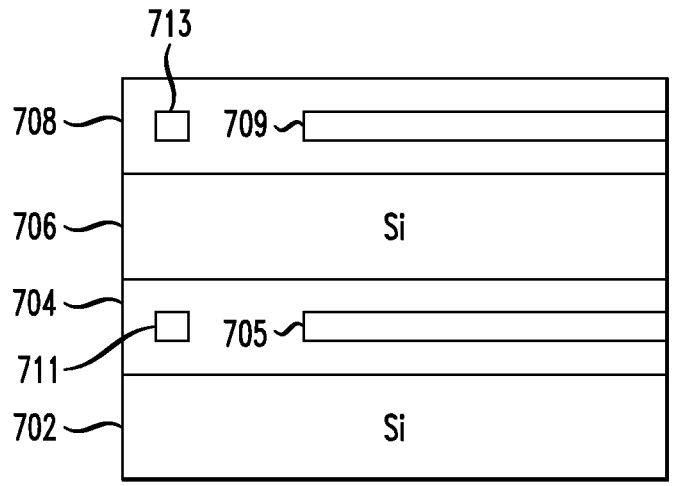
FIG. 7 is a cross-sectional view of a stacked substrate configuration in accordance with some embodiments.

FIG. 7 is a cross-sectional view of stacked chips in accordance with some embodiments. FIG. 7 shows two chips stacked vertically and oriented in (facing) the same direction in this example. Semiconductor substrate layers 702 and 706 may each be formed from silicon. Inductors 705 and 709 are disposed in respective layers 704 and 708 that may each be formed from a dielectric material, e.g., silicon dioxide, a low-K dielectric material (where κ denotes dielectric constant), or an extra low-κ (ELK; sometimes the term "extreme low-κ" is used) dielectric material. FIG. 7 shows, in an example configuration, an electrode 713 of a first capacitor at layer 708 and an electrode 711 of a second capacitor at layer 704. Various types of capacitors, e.g., MOS capacitors or metal-insulator-metal (MIM) capacitors, may be used. FIG. 7 shows an example configuration with MIM capacitors.

Advantageously, embodiments provide wireless inter-chip signaling without the need to develop entirely new processes, without additional manufacturing cost (e.g., due to additional process steps such as substrate thinning), without incurring additional chip area, without the need for peripheral circuits such as buffers, and without additional power consumption.

In some embodiments, a transformer includes first and second semiconductor substrates. The first semiconductor substrate includes a first circuit, a first coil providing a first impedance, and a first capacitor coupled in parallel with the first coil. The second semiconductor substrate includes a second circuit, a second coil providing a second impedance and inductively coupled with the first coil, and a second capacitor coupled in parallel with the second coil.

Some embodiments use a single transformer for inter-chip signaling. In other words, a single-input single-output configuration is used, instead of using a multiple-input single-output configuration employing multiple transformers to combine RF power.

In some embodiments, a communication system includes a transmitter unit, a receiver unit, and semiconductor substrate interface modules. The transmitter unit includes a first oscillator configured to provide a first clock signal, a first mixer configured to mix an analog input signal with the first clock signal to provide a first mixed signal, a power amplifier configured to amplify the first mixed signal to provide a transmission signal, and a transmit antenna configured to transmit the transmission signal. The receiver unit includes a receive antenna configured to receive the transmission signal, a low noise amplifier configured to amplify the received transmission signal, a second oscillator configured to provide a second clock signal, and a second mixer configured to mix an output of the low noise amplifier with the second clock signal to provide an analog output signal. The semiconductor substrate interface modules are configured to provide wireless communication between the first oscillator and the first mixer, between the first mixer and the power amplifier, between the power amplifier and the transmit antenna, between the receive antenna and the low noise amplifier, between the low noise amplifier and the second mixer, and between the second mixer and the second oscillator. Each interface module includes a pair of inductively coupled coils and a pair of capacitors. Each capacitor is coupled in parallel with a corresponding coil.

Although examples are illustrated and described herein, embodiments are nevertheless not limited to the details shown, since various modifications and structural changes may be made therein by those of ordinary skill within the scope and range of equivalents of the claims.

What is claimed is:

1. A transformer comprising:
a first semiconductor substrate underlying a first circuit, a first coil providing a first impedance, and a first capacitor coupled in parallel with the first coil, wherein the first coil and an electrode of the first capacitor are disposed in a first layer above the first semiconductor substrate; and
a second semiconductor substrate underlying a second circuit, a second coil providing a second impedance and inductively coupled with the first coil, and a second capacitor coupled in parallel with the second coil, wherein the second coil and an electrode of the second capacitor are disposed in a second layer above the second semiconductor substrate;
wherein the first capacitor is positioned above the second capacitor.

2. The transformer of claim 1 wherein the first and second capacitors are variable capacitors.

3. The transformer of claim 2 wherein the variable capacitors are tuned to provide equal capacitances.

4. The transformer of claim 1 wherein the first impedance is equal to the second impedance.

5. The transformer of claim 1, wherein the first circuit includes a first transmitting circuit configured to transmit a first signal, and the second circuit includes a first receiving circuit configured to receive the first signal.

6. The transformer of claim 5, wherein the second circuit further includes a second transmitting circuit configured to transmit a second signal, and the first circuit further includes a second receiving circuit configured to receive the second signal.

7. The transformer of claim 6, further comprising a switch configured to selectively couple the first capacitor and the first coil to the first transmitting circuit in a first switching state or to the second receiving circuit in a second switching state, the switch being configured to selectively couple the second capacitor and the second coil to the first receiving circuit in the first switching state or to the second transmitting circuit in the second switching state.

8. The transformer of claim 6, wherein:
the first circuit further includes a first switch configured to selectively couple the first capacitor and the first coil to the first transmitting circuit in a first switching state or to the second receiving circuit in a second switching state; and
the second circuit further includes a second switch configured to selectively couple the second capacitor and the second coil to the first receiving circuit when the first switch is in the first switching state or to the second transmitting circuit when the first switch is in the second switching state.

9. The transformer of claim 1, wherein the second semiconductor substrate is stacked above the first semiconductor substrate, and the second coil is positioned above the first coil.

10. A method comprising:
forming a first circuit, a first coil having a first impedance, and a first capacitor above a first semiconductor substrate, wherein the first capacitor is coupled in parallel with the first coil, and an electrode of the first capacitor and the first coil are disposed in a first layer above the first semiconductor substrate;
forming a second circuit, a second coil having a second impedance, and a second capacitor above a second semiconductor substrate, wherein the second capacitor is coupled in parallel with the second coil, wherein the first capacitor is formed above the second capacitor, and wherein the second coil and an electrode of the second capacitor are disposed in a second layer above the second semiconductor substrate; and
aligning the first and second semiconductor substrates, so that the respective coils of the aligned substrates are inductively coupled.

11. The method of claim 10 wherein the first and second capacitors are variable capacitors.

12. The method of claim 11, further including tuning the variable capacitors to provide equal capacitances.

13. The method of claim 10 wherein the first impedance is equal to the second impedance.

14. The method of claim 10, wherein:
the first circuit includes a first transmitting circuit configured to transmit a first signal, and the second circuit includes a first receiving circuit configured to receive the first signal.

15. The method of claim 14, wherein the second circuit further includes a second transmitting circuit configured to transmit a second signal, and the first circuit further includes a second receiving circuit configured to receive the second signal;
wherein the method further includes transmitting one of the first signal and the second signal from a corresponding transmitting circuit, and receiving said one signal at a corresponding receiving circuit.

16. The method of claim 14, further comprising selectively coupling the first capacitor and the first coil to the first transmitting circuit in a first switching state or to the second receiving circuit in a second switching state, and selectively coupling the second capacitor and the second coil to the first receiving circuit in the first switching state or to the second transmitting circuit in the second switching state.

17. The method of claim 10, wherein aligning the substrates includes stacking the second semiconductor substrate above the first semiconductor substrate and positioning the second coil above the first coil.

18. The method of claim 10, wherein the first and second layers include a dielectric material.

19. The method of claim 18, wherein the dielectric material includes silicon dioxide.

20. The method of claim 18, wherein the dielectric material is a low-k or extra low-k dielectric material.

* * * * *